US012705068B2

(12) United States Patent
Anamika et al.

(10) Patent No.: US 12,705,068 B2
(45) Date of Patent: Aug. 11, 2026

(54) ADJUSTING COMMANDS FOR APPLICATION EXECUTION

(71) Applicant: ServiceNow, Inc., Santa Clara, CA (US)

(72) Inventors: Anamika, Bangalore (IN); Abhishek Kumar, Bangalore (IN); Tal Ben Ari, Ness Ziyonna (IL); Ramesh Kumar, Bangalore (IN)

(73) Assignee: ServiceNow, Inc., Santa Clara, CA (US)

(*) Notice: Subject to any disclaimer, the term of this patent is extended or adjusted under 35 U.S.C. 154(b) by 256 days.

(21) Appl. No.: 18/415,422

(22) Filed: Jan. 17, 2024

(65) Prior Publication Data

US 2025/0231771 A1 Jul. 17, 2025

(51) Int. Cl.
*G06F 9/44* (2018.01)
*G06F 9/445* (2018.01)

(52) U.S. Cl.
CPC .................................. *G06F 9/44505* (2013.01)

(58) Field of Classification Search
CPC .................................... G06F 1/32; G06F 9/44
See application file for complete search history.

(56) References Cited

U.S. PATENT DOCUMENTS

| | | | | |
|---|---|---|---|---|
| 7,219,339 | B1 | 5/2007 | Goyal et al. | |
| 10,587,694 | B1 * | 3/2020 | Kumar | H04L 67/1095 |
| 2013/0144996 | A1 | 6/2013 | Bourakov et al. | |
| 2020/0311313 | A1 * | 10/2020 | Mondello | H04L 9/3236 |
| 2022/0173966 | A1 * | 6/2022 | Hill | H04L 67/34 |
| 2023/0403286 | A1 * | 12/2023 | Saxe | H04L 63/1425 |

* cited by examiner

*Primary Examiner* — Keshab R Pandey
(74) *Attorney, Agent, or Firm* — FLETCHER YODER PC

(57) ABSTRACT

Techniques described herein relate to using one or more machine learning models to identify values of variables to be used in application commands for execution. For example, the one or more machine learning models may identify one or more values of variables that are used to replace a different set of one or more values of variables in an application command before executing the command on a host.

20 Claims, 7 Drawing Sheets

ADJUSTING COMMANDS FOR APPLICATION EXECUTION

TECHNICAL FIELD

The present disclosure relates to using one or more machine learning models to identify values of variables for one or more commands associated with an application to be executed by a host.

BACKGROUND

In modern computing systems and environments, and as businesses increasingly rely on technology for their day-to-day operations, commands used by applications can vary. One host may execute application commands differently than another host and it is often difficult for the system to determine how to execute these application commands for each host given the differing formats and syntaxes in the commands.

BRIEF DESCRIPTION OF THE DRAWINGS

Various embodiments in accordance with the present disclosure will be described with reference to the drawings, in which.

DETAILED DESCRIPTION

Figure 1:
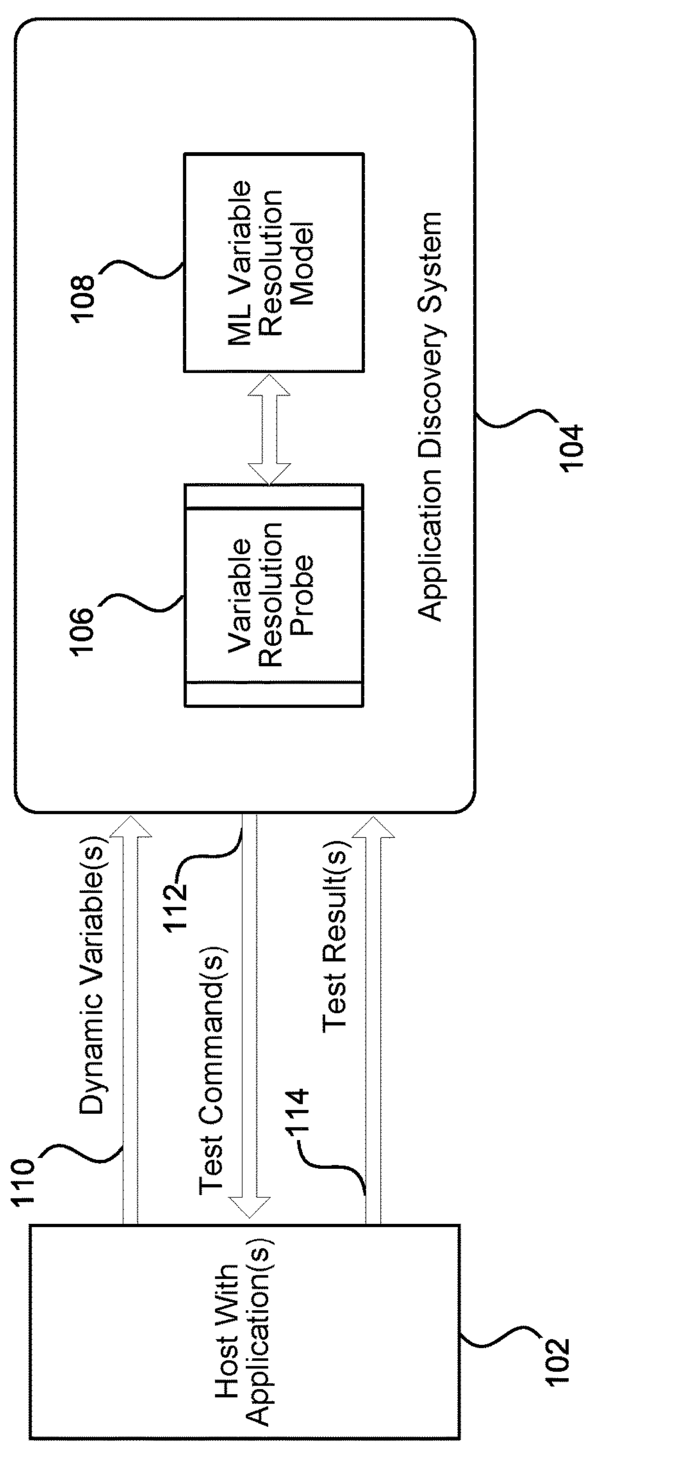
FIG. 1 illustrates an example of a system including a host and an application discovery system to identify dynamic variables and generate test commands for application discovery, according to at least one embodiment.

In preceding and following descriptions, various techniques are described. For purposes of explanation, specific configurations and details are set forth in order to provide a thorough understanding of possible ways of implementing techniques. However, it will also be apparent that techniques described below may be practiced in different configurations without specific details. Furthermore, well-known features may be omitted or simplified to avoid obscuring techniques being described.

In application execution environments, values of variables used in application commands are not identified until first running discovery on a host (e.g., a computing device that is connected to a network comprising multiple devices) to find what values the host uses to run the same type of application. Discovery requires parsing some or all the logs on the host to identify patterns and values used by one or more applications that run on the host. When a new application (which comprises temporary values for dynamic variables) seeks to run on the host, discovery must first be run on the host to determine how to replace the temporary values for the dynamic variables so that the new application has the correct values for proper execution. However, discovery may fail without the proper credentials to access the host. A request can also be sent to the host (e.g., customer) asking for the logs, but that can still require someone (e.g., a human user) to parse the logs to find which values are being used for which variables and for which applications running on the host, which can be a cumbersome task.

The present disclosure relates to using a machine learning model that identifies values of variables that can be used in commands for an application to run on a host. In some embodiments, the present disclosure uses one or more machine learning algorithms, one or more neural networks, artificial intelligence, and/or any combination thereof to identify values of variables that can be used in commands for applications to run a host. In at least one embodiment, the identified values replace temporary values in an application command before the application is executed on the host without having to run discovery on the host. That is, in at least one embodiment, the machine learning model generates a list of values for variables in application commands that can be used to replace the temporary values before an application is to be executed on the host. This way, application commands can comprise the proper values for execution on the host. Specifically, in at least one embodiment, the machine learning model uses a list of dynamic variables along with host details to determine the location of configuration files at the host and to obtain values that can be used to replace the temporary values of the dynamic variables. Commands may then be run on the host with these new values.

As application commands have variables as their part, the value of these variables differs depending upon the application type and host on which the application runs. To execute these commands, proper values for these variables would need to be in place, otherwise the commands would fail. In some embodiment, these variables could be the Transmission Control Protocol (TCP) port, the executable path, the home directory of the application, and the like. In some embodiments, the variables could also be the credentials (e.g., username and password) of the application. Running such commands would need the right resolution of the credentials depending upon the application type.

FIG. 1 illustrates an example of a system 100 configured to identify and resolve values for dynamic variables and generate a test command for application discovery according to at least one embodiment. In at least one embodiment, dynamic variables are variables that can change its value and/or size while an application runs. For example, dynamic variables can include one or a combination of: strings, numbers, and/or Boolean (true/false) types of dynamic variables. A dynamic variable can be created, for example, by creating an array where the values of the array can be mapped and accesses using a key. In some embodiments, dynamic variables are designated by a flag or indicator that is a dynamic variable compared to other variables (e.g., static variables). In at least one embodiment, the system 100 comprises a host 102 (e.g., computing device, system, processor, or the like) that runs one or more applications operably connected to an application discovery system 104 that comprises a variable resolution probe 106 that is operably connected to a machine learning (ML) variable resolution model 108. In an embodiment, the application discovery system 104 can be a system of a computer system 700 as described in FIG. 7 below. For example, at least a portion of the application discovery system 104 can be part of system of a computer system of a service provider of software solutions for various aspects of enterprise operations, such as in the field of IT service management (ITSM) and business process automation. In an embodiment, at least a part of the application discovery system 104 can be a part of a client network. For example, the variable resolution probe 106 can be an application of a mid-server of a client network. In an embodiment, the host 102 can be a computing system that is a part of a separate system that is remote from at least a portion of the application discovery system 104.

In an embodiment, application discovery can refer to a process of identifying one or more software applications and details of one or more applications that are running on a given device or service (e.g., host 102) in a network or system. In an embodiment, application discovery can provide information such as the name of the application, the version of the application, the location of the application in the network, the dependencies of the one or more applications on other software or hardware resources, users or processes that are using the one or more applications, and the like. In an embodiment, such information can be used for various suitable purposes such as software asset management, license compliance, network optimization, vulnerability management, and the like. For example, if an organization wants to upgrade network infrastructure, the organization may need to know which applications are running on which hosts, what resources these applications are using, and how these applications interact with each other, and application discovery can help the organization to plan the upgrade without disrupting the operation of these applications.

In an embodiment, the variable resolution probe 106 can comprise a component or application of a mid-server (such as the mid-server described in FIG. 7 below) of the application discovery system 104 that acts as an intermediary or bridge between different computing systems to connect tools, applications, devices and services to facilitating communication and data exchange within the application discovery system 104. That is, in an embodiment, mid-server variable resolution probe 106 can be a type of middleware configured for serving as an integration bridge that can include components for data transformation, routing, messaging, and the like, that facilitate routing requests and translating data formats between systems.

In an embodiment, the ML variable resolution model 108 (also referred to as simply a variable resolution model, machine learning model or a model) can comprise a model running on the application discovery system 104. In some embodiments, the ML variable resolution model 108 can be disposed on a remote system, server, or the like. For example, the variable resolution probe 106 and the ML variable resolution model 108 can be operably connected via a local area network (LAN), large area network (WAN), the Internet, or the like. While some embodiments can include use of a machine learning model, further embodiments can use any suitable type of artificial intelligence system, method or model such a neural network (NN), natural language processing (NLP), or the like. In an embodiment, the variable resolution probe 106 can comprise a component or application of a mid-server of a client network (such as the mid-server and client network described in FIG. 7 below) and the ML variable resolution model 108 can be a local application of a client network or an application of an application discovery service provider (such as the client network or provider platform described in FIG. 7 below).

In an embodiment, the application discovery system 104 is configured to obtain one or more dynamic variables from the host 102. The one or more dynamic variables may be associated with commands that may be run by the application discovery system 104 during application discovery of the one or more applications of the host 102 (e.g., such as in the example embodiment described in more detail with respect to FIG. 2 below).

The application discovery system 104 can use the variable resolution probe 106 to communicate with the ML variable resolution model 108 to resolve values for the one or more dynamic variables. The dynamic variables can be used to generate test commands that comprises syntax and protocols for a specific application to determine whether the commands will be successfully executed during application discovery. That is, for example, the test commands will comprise dynamic variables (e.g., such as in the example embodiments described in more detail with respect to FIGS. 3 and 4 below) that follow the protocol and/or syntax for that application to determine whether application discovery will be successful.

In an embodiment, one or more test commands 112 having identified values for the dynamic variables 110 can be sent to and run in the host 102 and results 114 of the commands 112 can be obtained by the application discovery system 104. For example, such results 114 can include an indication that a command has failed, an indication that the command has successfully executed, an indication that the command has failed in part, an indication that the command has succeeded in part, data obtained in response to a command (e.g., in response to a query for information from or about the host 102 and/or one or more applications), and the like.

In an embodiment, system 100 parses the pattern and collects all the commands required for the chosen application to be successfully discovered. In an embodiment, the system 100 smartly parses the dynamic variables in the commands and makes a list of those variables per host. The name of the application, list of dynamic variables and the host details may be sent to a mid-server (such as the mid-server described in FIG. 7) to further perform calls to an artificial intelligence engine that comprises a ML based model that is trained in a way, so that it identifies the (default) location of the configuration files in the host depending upon the application name and can further can parse those configuration files to get the values for the list of dynamic variables and send them back to the instance and populate the values for the desired dynamic variables. The system 100 will also have the capability to dynamically inject credentials from the credentials table if the commands contain usage of applicative credentials. Once all the dynamic variables and credentials (e.g., username and password), if available are resolved, the commands may be run on the host and command executed related failures can be predicted before even running the discovery.

In an embodiment, populating dynamic variables to be present in commands using ML based techniques enables support/customers to onboard new applications to a service provider's discovery, ensuring minimal issues and error prevention in application execution. In at least one embodiment, there would be no need to manually store the value for dynamic variables in a table as per host and application as the dynamic resolution of variables inside commands as described herein prevents maintenance costs of these mappings.

In an embodiment, the system 100 obtains commands with dynamic variables and stores the dynamic variables in a list, table, or mapping table. The system 100 may provide a placeholder in a command validation task to store the mapping of dynamic variables and associated values (e.g., current values, temporary values, placeholder values, previous values, expired values, or the like). The system 100 may execute commands with applicative credentials and inject correct credentials in place of certain values (e.g., $Username and $$Password) in the command. In an embodiment, system 100 provides functionality to automatically generate keys for the mappings as per the commands selected in the command validation task. In addition, an advanced command validation can be used to only execute commands which do not have dynamic variables.

In at least one embodiment and as described further in FIGS. 2-6, system 100 parses logic of commands code to extract command with dynamic variables and further uses pattern parsing logic to mark the dynamic variable with at least one prefix and suffix, in order to correctly recognize them. The commands are executed and tested with applicative credentials. In the case it does not works, the system 100 may receive instructions to change probe related implementations and support injecting applicative credentials. In some embodiment, system 100 adds a new column in a list to indicate that dynamic variables are present in the list. In an embodiment, system 100 prepares a schema for a new table which comprises one or more mappings. The table may further reference to the command validation task and add it to a related list comprising records of command validation tasks. Access control lists (ACLs) can also be added to the new mappings table. Once a user provides the mapping with values, the system 100 may run commands with dynamic variables, and replace temporary, expired or placeholder values with the correct or current value when mappings are complete. In an embodiment, a user interface (UI) can be configured with a 'Show commands' field where a new attribute such as 'Command has dynamic variables' is shown. In at least one embodiment, IP address and keys are populated once the task has commands with dynamic variables, via a new UI action. When mappings are not properly filled, then system 100 may not run command validation and informs the user that mappings needs to filled with values. In an embodiment, mapping are cleared when a command is changed from an existing task. Some commands with dynamic variables are skipped, when run via advanced command validation mode. In some embodiment, commands are not allowed to run when IP addresses are provided in network or range.

In an embodiment, some or all of the processes of system 100 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process of system 100 may be performed by any suitable system, such as the computing device 700 of FIG. 7.

Figure 2:
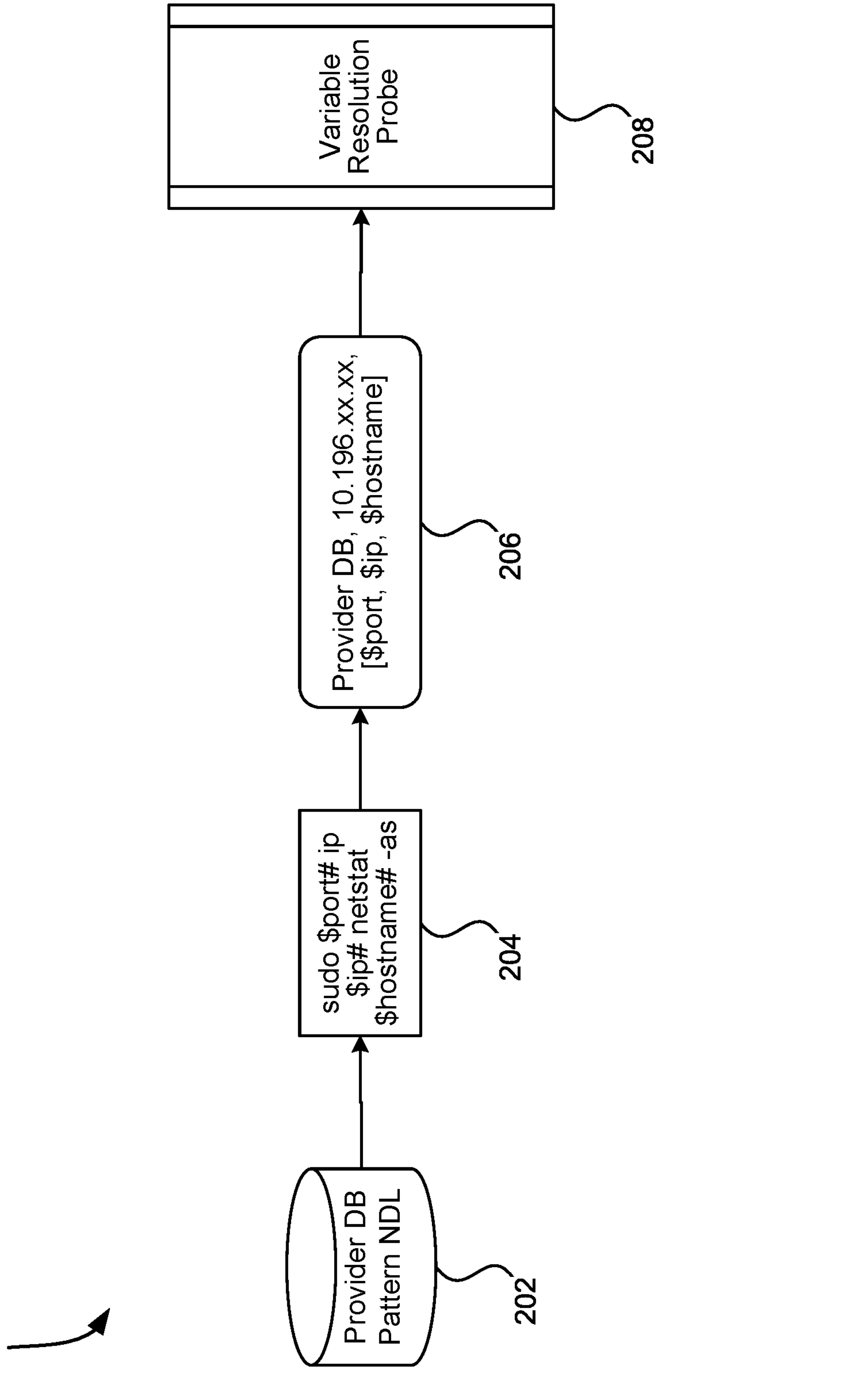
FIG. 2 illustrates a diagram of a process for a computer system generating inputs for a variable resolution probe based on commands that would be invoked by a pattern, according to at least one embodiment.

FIG. 2 illustrates a diagram of a process 200 for a computer system generating inputs for a variable resolution probe 208 based on commands that would be invoked by a pattern, in accordance with at least one embodiment. The variable resolution probe 208 is described in more detail with respect to FIG. 3 below.

In an embodiment, the computer system (such as the system 100 described in FIG. 1 above) parses a Network Description Language (NDL) of a database 202 and obtains one or more commands that a pattern of the NDL would invoke while running application discovery on a host. For example, an NDL can be a specialized language or format used to describe the structure, configuration, and attributes of applications, devices, services, or resources within a network that can provide a standardized and machine-readable way to define network elements, such as routers, switches, servers, and their attributes (e.g., IP addresses, MAC addresses, services running, and the like). In various embodiments, an NDL may be used in conjunction with network discovery and management tools to create a structured representation of a network's components.

In an embodiment, one or more patterns can be defined by an NDL or other structured languages and may be used to match against actual network data or configurations. In the context of application discovery on a host, a pattern may comprise a set of rules or criteria used to identify specific components or resources within a network. For example, a pattern may be designed to recognize different applications based on attributes, behaviors, or configurations of such applications and obtain details about applications such as the version of the application, the location of the application in the network, the dependencies of the application on other applications or services, the resources (e.g., memory, CPU, and disk space) used by the application, and the like.

In an embodiment, an NDL may describe the expected structure and attributes of applications within a network and one or more patterns of the NDL may define specific attributes of applications to look for during application discovery on a host that can include sending queries, running commands, or other suitable various processes to collect data about an application on the host. Collected data can be compared against one or more patterns of the NDL and if the attributes, structure or configurations of an application match the patterns, they are identified. Identified attributes, structure or configurations of an application can then be added to an inventory or documented for network management purposes.

For example, a pattern for a web server application may include components like an HTTP server, a database server, and a scripting engine. A pattern may specify that the HTTP server communicates with the scripting engine, which in turn communicates with the database server. When the discovery process observes these components and their interactions on a host, it can use the pattern to recognize that the host is running a web server application.

For example, where a pattern is designed to identify instances of a specific web server, (e.g., Apache), running on a host. This pattern may include a rule that defined "if a process is running that is listening on port 80, then this host is running a web server." To check if this rule is true, the pattern may invoke a command like netstat -tuln|grep ':$PORT', where $PORT is a dynamic variable representing the port number of interest (e.g., port 80). This command can list all processes listening on TCP and User Datagram Protocol (UDP) ports and then filters for processes listening on the specified port. If the command returns any results, then a determination can be made that a process is listening on port 80, and the pattern rule can be true. This can indicate that a web server (e.g., Apache) is running on the host.

During application discovery on a host, various suitable commands can be used that incorporate dynamic variables. For example, a command invoked during application discovery can include an SSH command used to log into a remote host and where the username and hostname can be dynamic variables. (e.g., ssh username@hostname). In another example, in an embodiment, a command invoked during application discovery can include a netstat command to display network connections where the TCP port can be a dynamic variable (e.g., netstat -an|grep:port). In a further example, in an embodiment, a command invoked during application discovery can include a find command used to locate files on a system, where the executable path may be a dynamic variable (e.g., find/-name executable_path). In yet another example, in an embodiment, a command invoked during application discovery can include a change directory (CD) command used to change directories, where the home directory may be a dynamic variable (e.g., cd/home/directory). In another example, in an embodiment, a command invoked during application discovery can include a ping command to check the connectivity to a host, where the IP address can be a dynamic variable (e.g., ping ip_address).

In an embodiment, various suitable commands or queries, including commands or queries with dynamic variables can used during application discovery on a host. For example, types or methods of a command used during application discovery on a host can include a shell command executed in an operating system shell; a Windows Management Instrumentation (WMI) query to manage data and operations on Windows-based operating systems; a Simple Network Management Protocol (SNMP) for managing devices on IP networks or used to retrieve information about network devices, (e.g., with tabular and scalar are types of SNMP queries that can retrieve multiple or single values respectively); SNMP walk used to retrieve a tree or sub-tree of management data objects within a device's Management Information Base (MIB); and HTTP GET to retrieve data from a host.

For example, returning to the illustrative embodiment of FIG. 2, in an embodiment, a shell command of "sudo $port# ip $ip# netstat $hostname# -as" 204 can be obtained from a provider database 202, where such a shell command 204 would be invoked by a pattern during application discovery of an application on a host. The 'sudo' command can allow running an application with the security privileges of another user (e.g., superuser or root), with the $port#, $ip#, and $hostname# being variables, which in this example are indicated by the $ and # symbols before and after the variables of 'port,' 'ip,' and 'hostname,' respectively. The portion "netstat -as" of the command 204 is a command-line tool can display network connections, routing tables, and a number of network interface and network protocol statistics, with the -as option displaying all sockets and statistics. In an embodiment, this command 204 or a version of this command 204 can be used to gather information about the network connections on the host. While a single example command 204 is illustrated in FIG. 2, in an embodiment, any suitable plurality of commands can be obtained in various suitable ways, including parsing one or more pattern of an NDL to identity such a plurality of commands that would be invoked by the one or more pattern.

In an embodiment, a set of one or more identified commands can be parsed to generate a list of dynamic variables that would need resolution for the commands to be properly executed on the host and formatted into an input 206 for a variable resolution probe 208 that can be used to resolve the dynamic variables. For example, the command 204 can be parsed to identify dynamic variables "[$port, $ip, $hostname]" and the input 206 can also include an identifier of the database 202 (i.e., "Provider DB" in this example) and an IP address (i.e., "10.196.xx.xx" in this example). In an embodiment, an input can include an identifier of an application at a host, an identifier of a host, or the like. In an embodiment, the input 206 can be sent to a variable resolution probe 208 that can be used to resolve the dynamic variables of the input 206 (i.e., "[$port, $ip, $hostname]" in this example).

Figure 3:
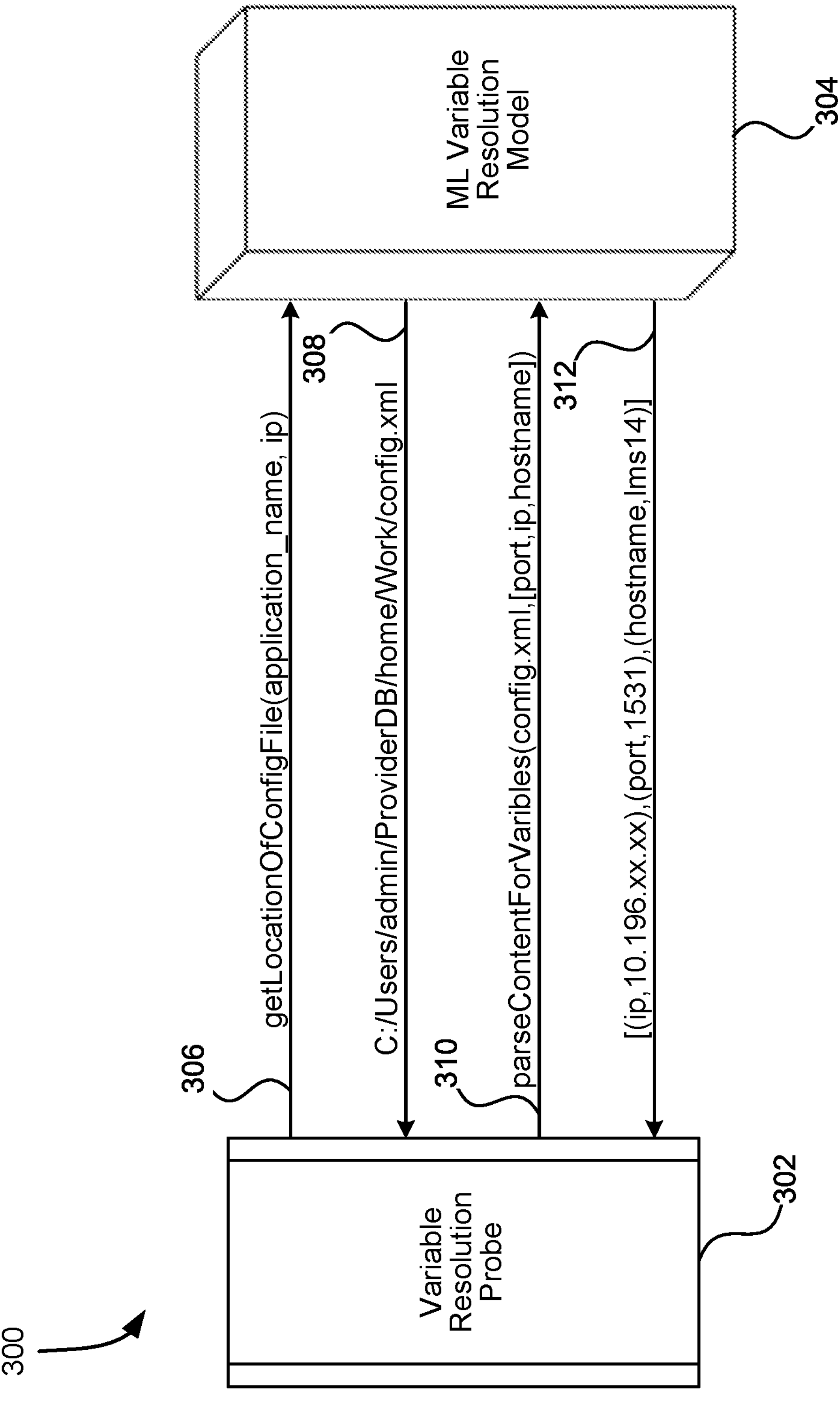
FIG. 3 illustrates a block diagram of a variable resolution probe and a machine learning variable resolution model for resolving one or more dynamic variables, according to at least one embodiment.

FIG. 3 is a block diagram 300 illustrating a variable resolution probe 302 and machine learning (ML) variable resolution model 304, along with a plurality of example communications 306, 308, 310, 312 therebetween for resolving one or more dynamic variables in accordance with at least one embodiment.

In an embodiment, the variable resolution probe 302 can comprise a component or application of a mid-server (such as the mid-server described in FIG. 7 below) that acts as an intermediary or bridge between different computing systems to connect tools, applications, devices and services to facilitating communication and data exchange within the computing system. That is, in an embodiment, mid-server resolution probe 302 can be a type of middleware configured for serving as an integration bridge that can include components for data transformation, routing, messaging, and the like, that facilitate routing requests and translating data formats between systems.

In an embodiment, the ML variable resolution model 304 can comprise a model running on a computing system that is the same computing system that the variable resolution probe 302 is running on, a remote system or server, or the like. For example, the variable resolution probe 302 and the ML variable resolution model 304 can be operably connected via a local area network (LAN), large area network (WAN), the Internet, or the like. While some embodiments can include use of a machine learning model, further embodiments can use any suitable type of artificial intelligence system, method or model such a neural network (NN), natural language processing (NLP), or the like.

In an embodiment, the variable resolution probe 302 can obtain one or more inputs (e.g., such as in the example described in more detail with respect to FIG. 2 above) that can be used to resolve one or more dynamic variables of the one or more inputs. In an embodiment, the variable resolution probe 302 can send a request 306 to the ML variable resolution model 304 to obtain the location of one or more configuration files on a host associated with an application, that is based on one or more identifiers. In an embodiment, such identifiers can include the name or other identifier of the application, and IP address of the host or application, and the like.

In an embodiment, the ML variable resolution model 304 can determine the location of one or more configuration files on the host associated with the application and send the location 308 to the variable resolution probe 302. For example, in the embodiment of FIG. 3, the ML variable resolution model 304 can send the file path "C:/Users/admin/ProviderDB/home/Work/config.xml," which can identify the location of the configuration file "config.xml."

Such a location and identity of one or more configuration files (e.g., one or more file paths) can be determined in various suitable ways. For example, when installing an application on a host, the installation process can provide a default file path or location for configuration files and information about default file paths, configuration file names, configuration file extensions, and the like, can be used to identify the location and identity of one or more configuration files on the host. In some examples, such an installation process can provide a default file path or location for configuration files, but a different file path or location can be selected or customized by a user. In some embodiments, information about expected files in a location where configuration files would be located and names or text that is similar or likely corresponding to file path or location where configuration files would be located can be used to identify the location or file path of one or more configuration files. A ML model can be trained in various suitable ways to identify such a file path or location including training data that comprises default file path or location information, examples of file paths, or locations identified in previous application discovery processes, and the like. In an embodiment, techniques described herein can use a pre-trained ML model to perform the identification of the configuration file locations and further using the list of variables to determine which values of commands to replace.

In an embodiment, the variable resolution probe 302 can obtain the of one or more configuration files and generate and send a request to resolve one or more dynamic variables. For example, in the embodiment of FIG. 3 the request 310 of "parseContentForVaribles (config.xml,[port,ip,hostname])," can include an identifier or location of the "config.xml" file along with a plurality of dynamic variables to resolve, including in this example the variables "port," "ip," and "hostname."

In an embodiment, the ML variable resolution model 304 (e.g., a machine learning model) can resolve the one or more dynamic variables based at least in part on the one or more configuration files and can send values for the resolved one or more dynamic variables to the variable resolution probe 302. For example, in the embodiment of FIG. 3, values for the variables "port," "ip," and "hostname" can be returned 312 as "[(ip,10.196.xx.xx),(port, 1531),(hostname,lms14)]."

In an embodiment, the one or more configuration files can include values that correspond to one or more identified dynamic variables and the ML variable resolution model 304 can be configured to identify such values. For example, the ML variable resolution model 304 can be trained on data that includes dynamic variables and corresponding values for dynamic variables present in configuration files.

In some embodiments, values for dynamic variables can be identified from other locations or in other ways. For example, a list of a plurality of user names and passwords can be stored in a table and resolving values for the dynamic variables of a given username and password can include determining which pair(s) of user name and passwords are correct or would work for a given command or use.

Figure 4:
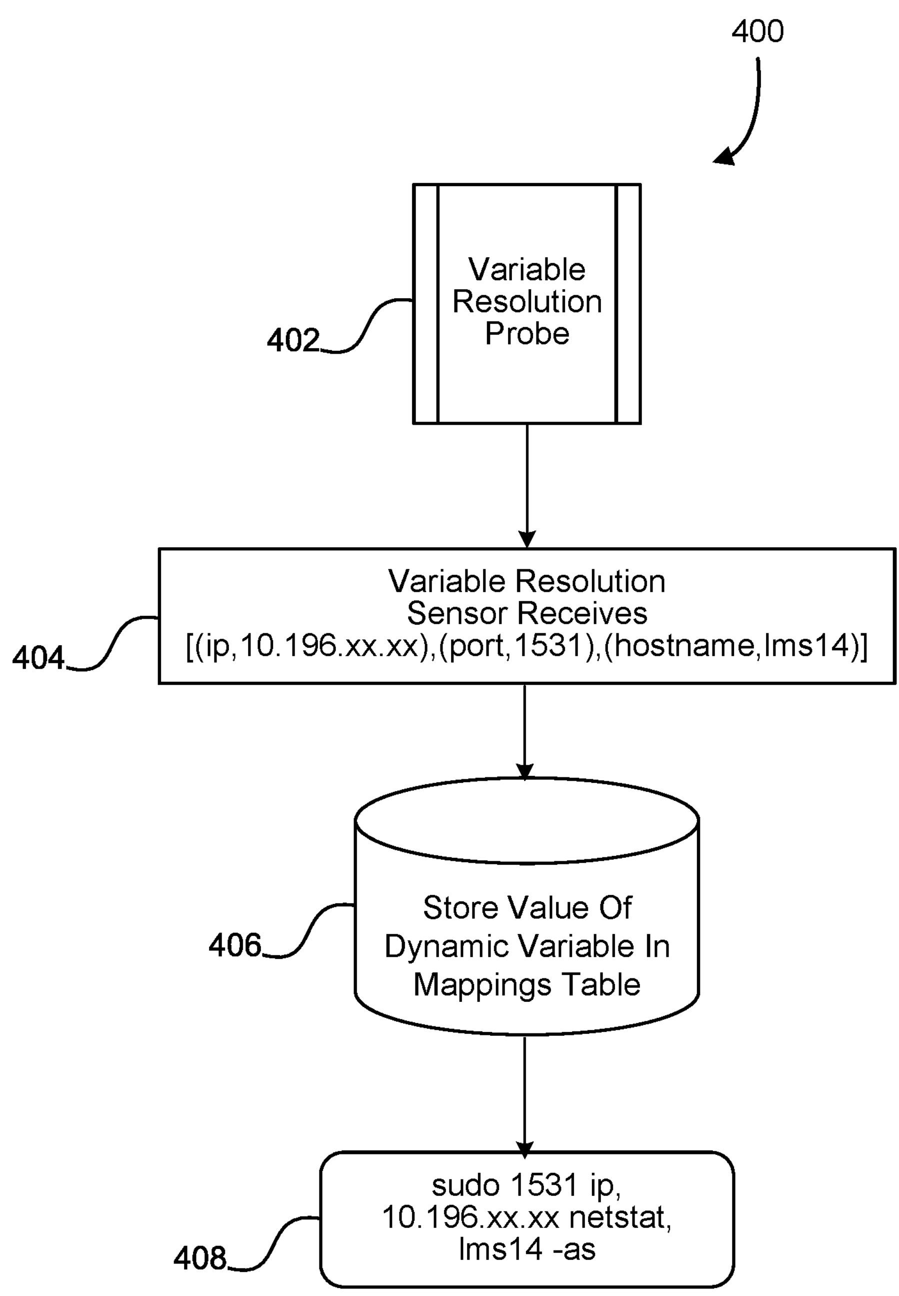
FIG. 4 illustrates a diagram of a process for a computer system generating commands based on stored values for dynamic variables obtained from a variable resolution probe, according to at least one embodiment.

FIG. 4 illustrates a diagram of a process 400 for a computer system generating commands based on stored values for dynamic variables obtained from a variable resolution probe 402, in accordance with at least one embodiment.

In an embodiment, the variable resolution probe 402 can comprise a component or application of a mid-server that acts as an intermediary or bridge between different computing systems to connect tools, applications, devices and services to facilitating communication and data exchange within the computing system. That is, in an embodiment, mid-server resolution probe 302 can be a type of middleware configured for serving as an integration bridge that can include components for data transformation, routing, messaging, and the like, that facilitate routing requests and translating data formats between systems.

In an embodiment, the variable resolution probe 402 can be configured to obtain values for dynamic variables; for example, as described in more detail above with respect to the embodiments of FIGS. 2 and 3. In an embodiment, such obtained values for dynamic variables can be actual values, temporary values, permanent values, placeholder values, pseudo-values, unique values, or the like. In an embodiment, values for dynamic variables can be obtained that are values for the dynamic variables that allow a command using the obtained values to properly execute at an application of a host. For example, where dynamic variables are "username" and "password" values can be obtained that are currently valid credentials that allow a command to be executed on a host to authenticate with the currently valid credentials; however, in an embodiment, such credentials can be changed in the future (e.g., by changing a user name and/or password), so in some embodiments, such credential values can be considered to be temporary values, current values, or the like.

In the example embodiment of FIG. 4, a variable resolution sensor can receive 404 values for the dynamic variables of "ip," "port," and "hostname" (e.g., [(ip,10.196.xx.xx), (port,1531), (hostname,lms14)], and these values can be stored in a mapping table 406 of dynamic variables. In an embodiment, such values can be associated or mapped to one or more applications, one or more hosts, and the like. In an embodiment, one or more of such values can be new values in a mapping table where values were previously not present, or one or more of such values can replace existing values in a mapping table. For example, where values for dynamic variables of "username" and "password" have not been previously obtained, such values can be newly stored in a mapping table. In an embodiment, where values for dynamic variables of "username" and "password" have been previously obtained, newly obtained values may or may not replace previously obtained values. For example, where dynamic variables of "username" and "password" have been previously obtained and the password has been updated since, but the username has not, obtaining current values for dynamic variables of "username" and "password" can allow the value for "username" to remain the same and the value for "password" to be updated. In an embodiment, values for dynamic variables stored in a mapping table 406 can be associated with one or more timestamp to indicate when the value was obtained, when the value was last successfully used in a command, or the like. Associating timestamps with values for dynamic variables stored in a mapping table 406 can be desirable in some embodiments to identify dynamic variables that may have stale values that should be updated, checked, re-evaluated, or the like.

In an embodiment, dynamic variables can include username, password, host name, TCP port, executable path, home directory, IP address, database name, service name, protocol type, operating system, application version, network interface, MAC address, disk space, memory usage, CPU usage, time zone, system uptime, process ID, and the like.

In an embodiment, commands can be generated using one or more values for dynamic variables stored in the mapping table 406 that is used to determine whether application discovery for an application on a host would be successful before running application discovery on the host. For example, commands used in application discovery can have dynamic variables that differs depending upon the application type and host on which the application runs (e.g., a username, password, TCP port, executable path, home directory of the application, and the like). In an embodiment, executing these commands during application discovery may need proper or valid values for these dynamic variables; otherwise, the commands may fail and the application discovery may fail completely or in part, which may create an undesirable user experience.

Accordingly, in an embodiment, commands with dynamic variables can be tested on an application and/or host before application discover is run to determine whether such commands will be successfully executed during application discovery so that any errors or failures of the commands can be addressed before running application discover or application discover can be run if it is determined that commands that will be run during application discovery on an application on a host will be suitably successful.

In an embodiment, a command invoked during application discovery can include a netstat command to display network connections where the TCP port, IP address and host name can be dynamic variables. To test such a command before application discovery is run, in an embodiment, such as in the example of FIG. 4, such a command 408 can be generated using values for "port," "ip," and "hostname" obtained from the mapping table 406 that may be identified in the mapping table 406 based at least in part on application and/or host that the command will be run on. For example, the resulting command 408 generated from values obtained from the mapping table 406 can be "sudo 1531 ip, 10.196.xx.xx netstat, lms14 -as." In an embodiment, such a shell command 408 can include the 'sudo' command to allow running the application at host "lms14" with the security privileges of another user (e.g., superuser or root) via port 1531 and IP address 10.196.xx.xx, and the portion "netstat -as" of the command 408 being a command-line tool can display network connections, routing tables, and a number of network interface and network protocol statistics, with the -as option displaying all sockets and statistics.

Figure 5:
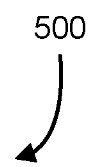
FIG. 5 illustrates an example process in which one or more machine learning (ML) models are used to identify values of variables that can be used in commands for an application to run on a host, according to at least one embodiment.
Figure 5:
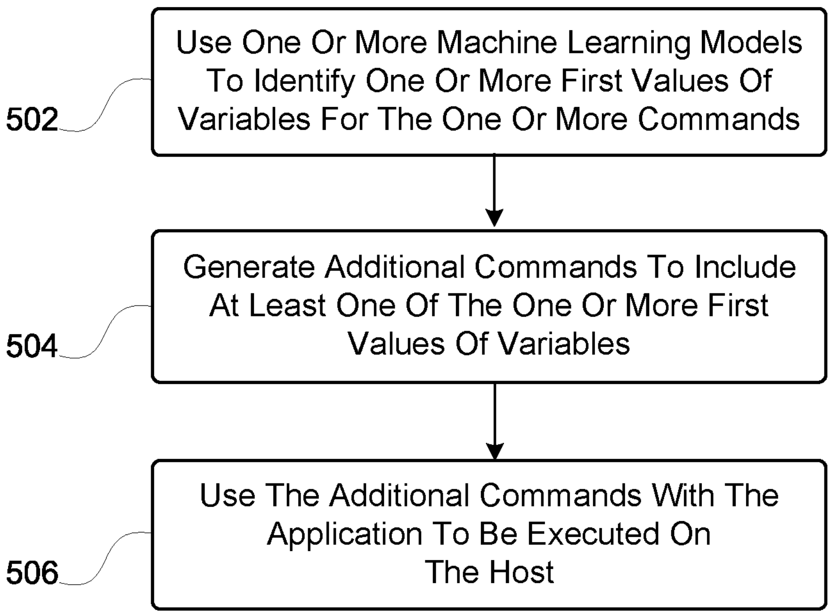

FIG. 5 illustrates an example process 500 in which one or more machine learning (ML) models are used to identify values of variables that can be used in commands for an application to run on a host, in accordance with at least one embodiment. In at least one embodiment, a computing system comprising a processor performs one or more steps 502-506 in process 500 using one or more computing systems such as the computing device 700 of FIG. 7.

In at least one embodiment, the identified values can be used to replace temporary values in an application command before being executed on the host without having to run discovery on the host. That is, in an embodiment, the machine learning model generates a list of values for variables in application commands that can be used to replace the temporary values before an application is to be executed on the host such that application commands comprise the proper values for execution on the host. In an embodiment, a computing system comprising the processor identifies one or more first values of variables of one or more commands associated with an application (e.g., used by the application) that is executed on a host 506.

For example, such variables can include one or more of a username, a password, a host name of the host, a TCP port of the application, executable path of the application, home directory of the application, IP address, and the like. For example, such commands can include an SSH command, a netstat command, a find command, a CD (change directory) command, a ping command, Shell Command, WMI query, SNMP query (e.g., tabular and scalar), SNMP walk, HTTP GET, and the like. In an embodiment, one or more machine learning models are used to identify one or more first values of variables for the one or more commands 504. For example, a machine learning model, which may or may not be separate from the computing system, uses a list of dynamic variables along with host details to determine the location of configuration files at the host and obtain values that can be used to replace the temporary, expired or placeholder values for the dynamic variables. While some embodiments can include use of a machine learning model, further embodiments can use any suitable type of artificial intelligence system or method such a neural network (NN), natural language processing (NLP), or the like.

For example, such values for variables can include values for one or more of a username, a password, a host name of the host, a TCP port of the application, executable path of the application, home directory of the application, IP address, and the like. In an embodiment, the computing system generates additional commands to include at least one of the one or more first values of variables 504. For example, such commands can include an SSH command, a netstat command, a find command, a CD (change directory) command, a ping command, Shell Command, WMI query, SNMP query (e.g., tabular and scalar), SNMP walk, HTTP GET, and the like. In an embodiment, the computing system uses the additional commands with the application to be executed on the host 506.

Accordingly, in an embodiment, application commands can be run on the host with new values used to replace temporary values in the application commands without having to run discovery on the host first to obtain values to obtain values to replace temporary values in the application commands. In some examples, such discovery would include parsing all the logs on the host to identify patterns and values used by applications that run on the host to determine how to replace temporary values so that the application has the correct values for proper execution. Additionally, in an embodiment, application commands can be run on the host with new values used to replace temporary values in the application commands without having to send a request to the host (e.g., customer) asking for the logs, which in some examples but that would still require a human user to perform the cumbersome task of parsing the logs to find which values are being used for which variables and for which applications running on the host.

Figure 7:
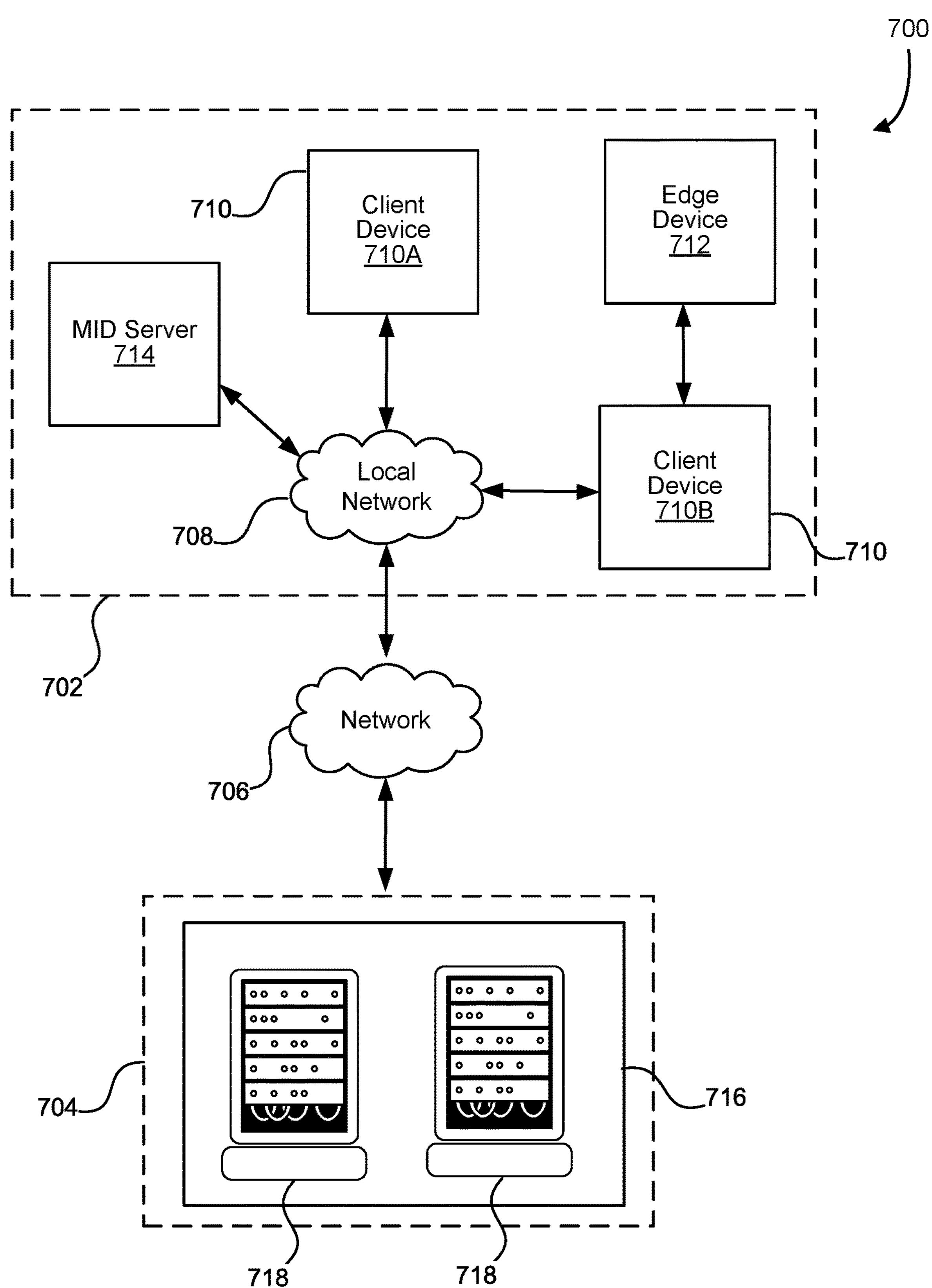
FIG. 7 illustrates a system in which various embodiments can be implemented.

In at least one embodiment, a processor performs one or more steps 502, 504, 506, in process 500 using one or more systems described in FIG. 7 (e.g., see elements 704, 710, 712, 714, 716, and 718 in FIG. 7). In at least one embodiment, one or more steps in process 500 are otherwise combined, performed in series, and/or performed in parallel. In at least one embodiment, some or all of process 500 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 500 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 500 is performed at least in part on a computer system such as those described elsewhere in this disclosure. In at least one embodiment, logic (e.g., hardware, software, or a combination of hardware and software) performs process 500.

Figure 6:
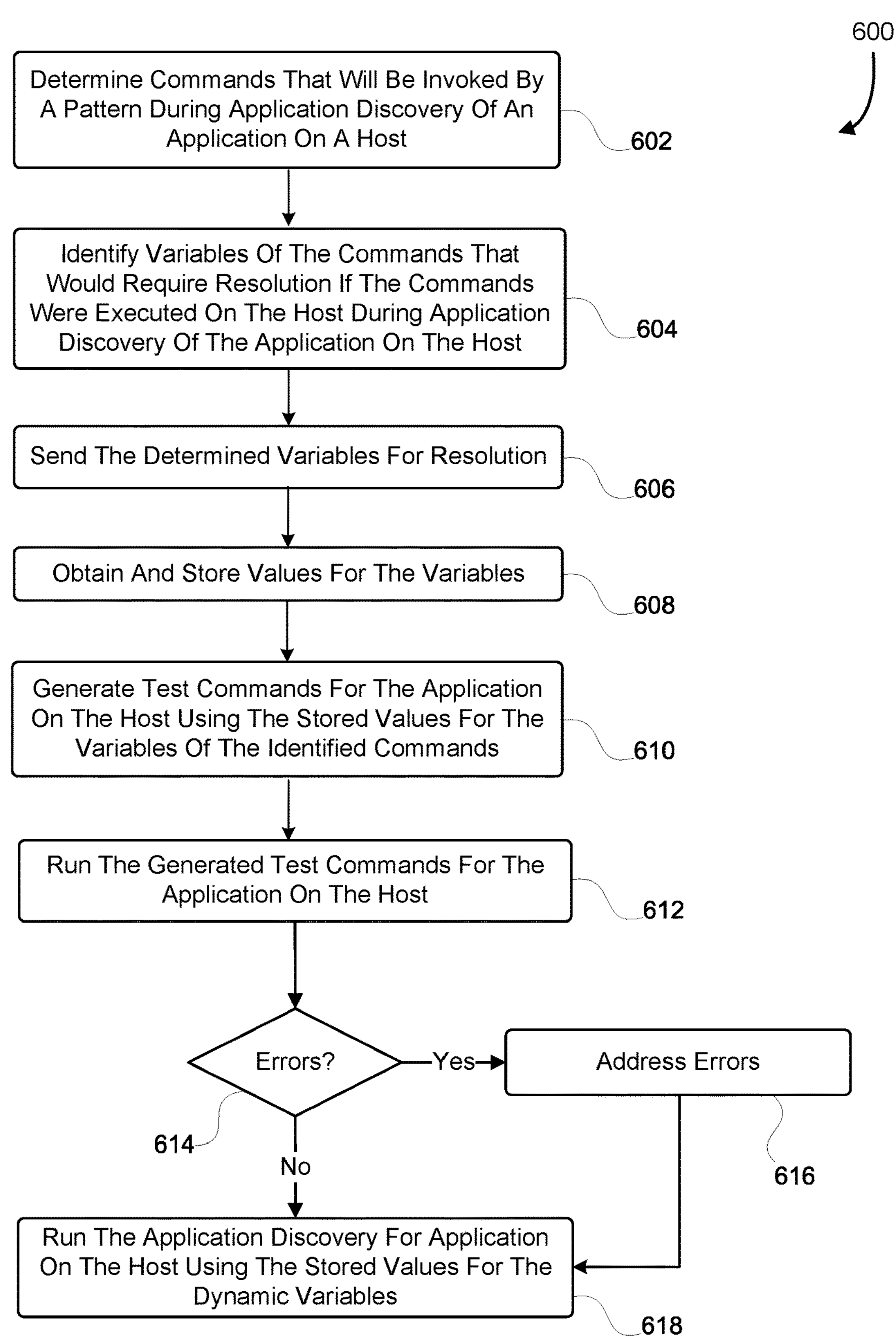
FIG. 6 illustrates an example process in which a system identifies and resolves values for dynamic variables and generates one or more test commands for application discovery, according to at least one embodiment.

FIG. 6 illustrates an example process 600 in which a system identifies and resolves values for dynamic variables and generates one or more test commands for application discovery, in accordance with at least one embodiment. In at least one embodiment, a processor performs one or more steps 602-618 in process 600 using one or more computing systems such as the computing device 700 of FIG. 7.

In at least one embodiment, one or more commands that will be invoked by a pattern during application discovery of at least one application on a host are determined 602. In an embodiment, variables of the commands that would require resolution if the commands were executed on the host during application discovery of the one or more application on the host are identified 604.

For example, an application discovery system can be configured to obtain one or more dynamic variables from the host. The one or more dynamic variables may be associated with commands that may be run by the application discovery system during application discovery of the one or more applications of the host (e.g., such as in the example embodiment described in more detail with respect to FIG. 2 above). In an embodiment, application discovery system parses a Network Description Language (NDL) of a host and obtains one or more commands that a pattern of the NDL would invoke while running application discovery on one or more applications of the host and parses the obtained one or more commands to identify dynamic variables that would require resolution if the commands were executed on the host during application discovery using such dynamic variables.

In an embodiment, determined variables for resolution are sent for resolution 606 and values for the variables are obtained and stored 608. In an embodiment, one or more test commands, for one or more applications on the host using the stored values for the variables of the identified commands, are generated 610 and the one or more test commands for the one or more applications on the host are run 612. For example, an application discovery system can use a variable resolution probe to communicate with a variable resolution model to resolve values for one or more dynamic variables that can be used to generate test commands for determining whether the such commands will be successfully executed during application discovery using such commands or commands with such dynamic variables (e.g., such as in the example embodiments described in more detail with respect to FIGS. 3 and 4 above). In an embodiment, one or more test commands having identified values for the dynamic variables can be sent to and run in the host and results of the commands can be obtained by the application discovery system.

In an embodiment, a determination can be made whether there are any errors associated with the one or more commands 614, and if not, application discovery for one or more application on the host can be run using one or more stored values for the dynamic variables 618. Errors that occur in application discovery can include, for example, but are not limited to: input/output errors, authentication errors, system requirement errors, window errors, command errors, component errors, and the like. If errors are identified, such errors can be addressed 616 and then application discovery for the one or more applications on the host can be run using one or more stored values for the dynamic variables 618.

For example, one or more test commands having identified values for the dynamic variables can be sent to and run in the host and results of the commands can be obtained by the application discovery system. The results of the commands can include an indication that a command has failed, an indication that the command has successfully executed, an indication that the command has failed in part, an indication that the command has succeeded in part, data obtained in response to a command (e.g., in response to a query for information from or about the host and/or one or more applications), and the like.

In an embodiment, such results can be used to determine whether application discovery should be run 618 on one or more applications on the host or whether remediation steps should be taken before application discovery is run 618 on one or more applications on the host. For example, where the results indicate that one or more commands have failed in full or in part, a determination can be made to address 616 these failures before running application discovery 618. In an embodiment, addressing 616 such failures can include obtaining dynamic variables; re-resolving values for dynamic variables (e.g., because previously resolved temporary values for such dynamic variables are stale, have become incorrect as dynamic variables have changed, have expired, or the like); re-generating test commands (e.g., because a form or other aspect of a command is incorrect); obtaining values for dynamic variables in another way (e.g., having a user lookup or otherwise obtain such values, or the like).

In an embodiment, commands that have failed in whole or in part can be re-tested or new test commands can be generated as a part of performing remedial actions that can return results that can be further used to determine whether application discovery should be run 618. For example, commands that generated errors can be re-run as a remedial action until all commands are successful or until all commands are suitably successful above a threshold or criteria for success, and a determination can be made that application discovery should be run 618 based at least in part on a determination that running application discovery 618 will be successful, that running application discovery 618 will be likely to be successful above a confidence level or meeting criteria, or the like. Accordingly, in an embodiment, addressing errors 616 associated with one or more commands can include remedial actions such as an interactive process of re-running test commands until they are successful or otherwise suitable for application discovery, which in some examples can help ensure that application discovery will or likely will run without any errors or without any substantial errors above a threshold or meeting a set of criteria. Such a process 600 can provide for improved user experience with application discovery by determining that there will not be major problems with application discovery before it is run.

In at least one embodiment, a processor performs one or more steps 602-618 in process 600 using one or more systems described in FIG. 7 (e.g., see elements 704, 710, 712, 714, 716, and 718 in FIG. 7). In at least one embodiment, one or more steps in process 600 are otherwise combined, performed in series, and/or performed in parallel. In at least one embodiment, some or all of process 600 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 600 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 600 is performed at least in part on a computer system such as those described elsewhere in this disclosure. In at least one embodiment, logic (e.g., hardware, software, or a combination of hardware and software) performs process 600.

FIG. 7 illustrates a system 700 in which various embodiments can be implemented. The computing system 700 may include a client network 702 and a provider platform 704 that are operably connected via a network 706 (e.g., the Internet). In an embodiment, the client network 702 may be a private local network 708, such as a local area network (LAN) that includes a variety of network devices that include, but are not limited to, switches, servers, and routers. In an embodiment, the client network 702 can comprise an enterprise network that can include one or more LANs, virtual networks, data centers, and/or other remote networks. In an embodiment, the client network 702 can be operably connected to one or more client devices 710 such as example client device 710A, 710B so that the client devices 710 are able to communicate with each other and/or with the provider platform 704. In an embodiment, the client devices 710 can be computing systems and/or other types of computing devices generally referred to as Internet of Things (IoT) devices that can access cloud computing services, for example, via a web browser application or via an edge device 712 that may act as a gateway between one or more client devices 710 and the platform 704 (e.g., second client device 710B). In an embodiment, the client network 702 can include a management, instrumentation, and discovery (MID) server 714 that facilitates communication of data between the network hosting the platform 704, other external applications, data sources, and services, and the client network 702. In an embodiment, the client network 702 may also include a connecting network device (e.g., a gateway or router) or a combination of devices that implement a customer firewall or intrusion protection system.

In an embodiment, the client network 702 can be operably coupled to the network 706, which may include one or more suitable computing networks, such a large area network (LAN), wide area networks (WAN), the Internet, and/or other remote networks, that are operable to transfer data between the client devices 710 and the provider platform 704. In an embodiment, one or more computing networks within network 706 can comprise wired and/or wireless programmable devices that operate in the electrical and/or optical domain. For example, network 706 may include wireless networks, such as cellular networks (e.g., Global System for Mobile Communications (GSM) based cellular network), WIN networks, and/or other suitable radio-based networks. The network 706 may also employ any suitable network communication protocols, such as Transmission Control Protocol (TCP), Internet Protocol (IP), and the like. In an embodiment, network 706 may include a variety of network devices, such as servers, routers, network switches, and/or other suitable network hardware devices configured to transport data over the network 706.

In an embodiment, the provider platform 704 may be a remote network (e.g., a cloud network) that is able to communicate with the client devices 710 via the client network 702 and network 706. In an embodiment, the provider platform 704 can comprise a configuration management database (CMDB) platform. In an embodiment, the provider platform 704 provides additional computing resources to the client devices 710 and/or the client network 702. For example, by utilizing the provider platform 704, in some examples, users of the client devices 710 are able to build and execute applications for various enterprise, IT, and/or other organization-related functions. In one embodiment, the provider platform 704 can be implemented on the one or more data centers 716, where each data center 716 can correspond to a different geographic location in some examples. In an embodiment, one or more the data centers 716 includes a plurality of servers 718 (also referred to in some examples as application nodes, virtual servers, application servers, virtual server instances, application instances, application server instances, or the like), where each server 718 can be implemented on a physical computing system, such as a single electronic computing device (e.g., a single physical hardware server) or across multiple-computing devices (e.g., multiple physical hardware servers). Examples of servers 718 can include a virtual server, a web server (e.g., a unitary Apache installation), an application server (e.g., a unitary Java Virtual Computer), and/or a database server.

To utilize computing resources within the provider platform 704, in an embodiment, network operators may choose to configure the data centers 716 using a variety of computing infrastructures. In an embodiment, one or more of the data centers 716 can be configured using a multi-instance cloud architecture to provide every customer with its own unique customer instance or instances. For example, a multi-instance cloud architecture of some embodiments can provide each customer instance with its own dedicated application server and dedicated database server. In some examples, the multi-instance cloud architecture could deploy a single physical or virtual server 718 and/or other combinations of physical and/or virtual servers 718, such as one or more dedicated web servers, one or more dedicated application servers, and one or more database servers, for each customer instance. In an embodiment of a multi-instance cloud architecture, multiple customer instances can be installed on one or more respective hardware servers, where each customer instance is allocated certain portions of the physical server resources, such as computing memory, storage, and processing power. By doing so, in some examples each customer instance has its own unique software stack that provides the benefit of data isolation, relatively less downtime for customers to access the platform 704, and customer-driven upgrade schedules.

In some embodiments, the provider platform 704 includes a computer-generated data management server that receives, via network 706 and/or an internal network within or across different data centers, computer-generated data for storage and analysis. For example, log entries can be sent from client devices/servers 710, MID server 714 (e.g., agent server acting as the intermediary in client network 702 to facilitate access to client network 702 by the network hosting the platform 704), and/or servers in data centers 716 to a log management server in data centers 716.

Although FIG. 7 illustrates a specific embodiment of a cloud computing system 700, the disclosure is not limited to the specific embodiments illustrated in FIG. 7. For instance, although FIG. 7 illustrates that the platform 704 is implemented using data centers, other embodiments of the platform 704 are not limited to data centers and can utilize other types of remote network infrastructures. Some embodiments may combine one or more different virtual servers into a single virtual server. The use and discussion of FIG. 7 are only examples to facilitate ease of description and explanation and are not intended to limit the disclosure to the specific examples illustrated therein. In an embodiment, the respective architectures and frameworks discussed with respect to FIG. 7 can incorporate suitable computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Embodiments of the disclosure can be described in view of the following clauses:

1. A method comprising:

identifying, via one or more machine learning models, one or more first values of variables for one or more commands, wherein the one or more first values are associated with an application executed on a host, and wherein identifying the one or more first values is based, at least in part, on the application and the host;

generating additional commands to include at least one of the one or more first values of variables; and initiating, via the application, execution of the additional commands on the host.

2. The method of clause 1, further comprising:

using the one or more machine learning models to identify a location of configuration files in the host; and determining based, at least in part, on the configuration files the one or more first values of variables.

3. The method of any one of clauses 1-2, further comprising identifying the location of the configuration files in the host based, at least in part, on the application.

4. The method of clause 1, wherein the one or more machine learning models identifies the one or more first values of variables for the one or more commands based, at least in part, on a name of the application, a list of dynamic variables, and information about the host.

5. The method of clause 1, further comprising determining whether the additional commands comprise an error prior to executing the additional commands on the host and performing one or more remedial actions based on a determined error.

6. The method of clause 1, further comprising adding one or more credentials to the additional commands before execution of the additional commands on the host.

7. A system comprising:

one or more processors; and memory including computer-executable instructions that, if executed by the one or more processors, cause the system to:

identify, via one or more machine learning models, one or more first values of variables for one or more commands, wherein the one or more first values are associated with an application executed on a host, and wherein identifying the one or more first values is based, at least in part, on the application and the host;

generate additional commands to include at least one of the one or more first values of variables; and initiate, via the application, execution of the additional commands on the host.

8. The system of clause 7, wherein the one or more processors are to send a request to the one or more machine learning models to obtain a location of one or more configuration files on the host associated with the application.

9. The system of any one of clauses 7-8, wherein the one or more first values of variables are replaced based, at least in part, on the location of the one or more configuration files on the host associated with the application.

10. The system of clause 7, wherein the one or more first values of variables comprise temporary values for a username and password; and wherein the one or more first values of variables are values for the username and password to be used by the application when executed on the host.

11. The system of clause 7, wherein the one or more first values of variables comprise temporary values for at least one of a port, IP address, and hostname; and wherein the one or more first values of variables are values for the at least one of a port, IP address, and hostname to be used by the application when executed on the host.

12. The system of clause 7, wherein the one or more processors are to use the one or more machine learning models to generate a list comprising one or more values of variables to be used by the application.

13. A non-transitory computer-readable storage medium storing thereon executable instructions which, when executed by one or more processors of a computer system, cause the computer system to at least:

identify, via one or more machine learning models, one or more first values of variables for one or more commands, wherein the one or more first values are associated with an application executed on a host, and wherein identifying the one or more first values is based, at least in part, on the application and the host;

generate additional commands to include at least one of the one or more first values of variables; and initiate, via the application, execution of the additional commands on the host.

14. The non-transitory computer-readable storage medium of clause 13, wherein the one or more models comprise a machine learning model or a neural network.

15. The non-transitory computer-readable storage medium of clause 13, wherein the instructions further comprise instructions which, when executed by the one or more processors, cause the computer system to:

use the one or more models to determine the one or more first values of variables for the one or more commands; and store the one or more first values as being associated with the application and the host, wherein the one or more first values are stored in a mappings table that replace previous values in the mapping table.

16. The non-transitory computer-readable storage medium of clause 13, wherein the instructions further comprise instructions which, when executed by the one or more processors, cause the computer system to identify the one or more commands based, at least in part, on a pattern of a network description language.

17. The non-transitory computer-readable storage medium of clause 13, wherein the instructions further comprise instructions which, when executed by the one or more processors, cause the computer system to send one or more commands to the one or more models to generate a table comprising the additional commands based, at least in part, on configuration files of the application.

18. The non-transitory computer-readable storage medium of any one of clauses 13 and 17, wherein the one or more models are to determine a location of the configuration files based, at least in part, on a name of the application.

19. The non-transitory computer-readable storage medium of clause 13, wherein the instructions further comprise instructions which, when executed by the one or more processors, cause the computer system to determine whether at least one of the additional commands executed on the host with the application have failed before execution of the application on the host.

20. The non-transitory computer-readable storage medium of any one of clauses 13 and 19, wherein the instructions further comprise instructions which, when executed by the one or more processors, cause the computer system to perform remediation by using the one or more models to generate commands comprising one or more second values of variables to replace the additional commands.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the resent disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A method comprising:

identifying, via one or more machine learning models, one or more first values of variables to replace temporary values in one or more commands, wherein the one or more first values are associated with an application executed on a host, and wherein identifying the one or more first values is based, at least in part, on the application and the host;

generating additional commands to include at least one of the one or more first values of variables by replacing the temporary values in the one or more commands with the one or more first values of variables; and initiating, via the application, execution of the additional commands on the host.

2. The method of claim 1, further comprising:

using the one or more machine learning models to identify a location of configuration files in the host; and determining based, at least in part, on the configuration files the one or more first values of variables.

3. The method of claim 2, further comprising identifying the location of the configuration files in the host based, at least in part, on the application.

4. The method of claim 1, wherein the one or more machine learning models identifies the one or more first values of variables for the one or more commands based, at least in part, on a name of the application, a list of dynamic variables, and information about the host.

5. The method of claim 1, further comprising determining whether the additional commands comprise an error prior to executing the additional commands on the host and performing one or more remedial actions based on a determined error.

6. The method of claim 1, further comprising adding one or more credentials to the additional commands before execution of the additional commands on the host.

7. A system comprising:

one or more processors; and memory including computer-executable instructions that, if executed by the one or more processors, cause the system to:

identify, via one or more machine learning models, one or more first values of variables to replace temporary values in one or more commands, wherein the one or more first values are associated with an application executed on a host, and wherein identifying the one or more first values is based, at least in part, on the application and the host;

generate additional commands to include at least one of the one or more first values of variables by replacing the temporary values in the one or more commands with the one or more first values of variables; and initiate, via the application, execution of the additional commands on the host.

8. The system of claim 7, wherein the one or more processors are to send a request to the one or more machine learning models to obtain a location of one or more configuration files on the host associated with the application.

9. The system of claim 8, wherein the one or more first values of variables are replaced based, at least in part, on the location of the one or more configuration files on the host associated with the application.

10. The system of claim 7, wherein the temporary values comprise temporary values for a username and password; and wherein the one or more first values of variables are values for the username and password to be used by the application when executed on the host.

11. The system of claim 7, wherein the temporary values comprise temporary values for at least one of a port, IP address, and hostname; and wherein the one or more first values of variables are values for the at least one of a port, IP address, and hostname to be used by the application when executed on the host.

12. The system of claim 7, wherein the one or more processors are to use the one or more machine learning models to generate a list comprising one or more values of variables to be used by the application.

13. A non transitory computer readable storage medium storing thereon executable instructions which, when executed by one or more processors of a computer system, cause the computer system to at least:

identify, via one or more machine learning models, one or more first values of variables to replace temporary values in one or more commands, wherein the one or more first values are associated with an application executed on a host, and wherein identifying the one or more first values is based, at least in part, on the application and the host;

generate additional commands to include at least one of the one or more first values of variables by replacing the temporary values in the one or more commands with the one or more first values of variables; and initiate, via the application, execution of the additional commands on the host.

14. The non transitory computer readable storage medium of claim 13, wherein the one or more machine learning models comprise a machine learning model or a neural network.

15. The non transitory computer readable storage medium of claim 13, wherein the instructions further comprise instructions which, when executed by the one or more processors, cause the computer system to:

use the one or more machine learning models to determine the one or more first values of variables for the one or more commands; and store the one or more first values as being associated with the application and the host, wherein the one or more first values are stored in a mappings table that replace previous values in the mapping table.

16. The non transitory computer readable storage medium of claim 13, wherein the instructions further comprise instructions which, when executed by the one or more processors, cause the computer system to identify the one or more commands based, at least in part, on a pattern of a network description language.

17. The non transitory computer readable storage medium of claim 13, wherein the instructions further comprise instructions which, when executed by the one or more processors, cause the computer system to send one or more commands to the one or more machine learning models to generate a table comprising the additional commands based, at least in part, on configuration files of the application.

18. The non transitory computer readable storage medium of claim 17, wherein the one or more machine learning models are to determine a location of the configuration files based, at least in part, on a name of the application.

19. The non transitory computer readable storage medium of claim 13, wherein the instructions further comprise instructions which, when executed by the one or more processors, cause the computer system to determine whether at least one of the additional commands executed on the host with the application have failed before execution of the application on the host.

20. The non transitory computer readable storage medium of claim 19, wherein the instructions further comprise instructions which, when executed by the one or more processors, cause the computer system to perform remediation by using the one or more machine learning models to generate commands comprising one or more second values of variables to replace the additional commands.

* * * * *